(12) United States Patent
Yoshida

(10) Patent No.: US 11,967,220 B2
(45) Date of Patent: Apr. 23, 2024

(54) COMMUNICATION CONTROL DEVICE, MOBILE OBJECT, COMMUNICATION CONTROL METHOD, AND COMPUTER-READABLE STORAGE MEDIUM

(71) Applicant: HONDA MOTOR CO.,LTD., Tokyo (JP)

(72) Inventor: Suguru Yoshida, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 138 days.

(21) Appl. No.: 17/681,824

(22) Filed: Feb. 27, 2022

(65) Prior Publication Data

US 2022/0292952 A1 Sep. 15, 2022

(30) Foreign Application Priority Data

Mar. 10, 2021 (JP) .................. 2021-038536

(51) Int. Cl.
*G08B 25/10* (2006.01)
*H04M 3/51* (2006.01)

(52) U.S. Cl.
CPC ........... *G08B 25/10* (2013.01); *H04M 3/5116* (2013.01)

(58) Field of Classification Search
CPC ...... G08B 25/10; G08B 25/016; G08B 25/08; H04M 3/5116; H04M 2242/15; G08G 1/166; G08G 1/01
See application file for complete search history.

(56) References Cited

U.S. PATENT DOCUMENTS

| | | | |
|---|---|---|---|
| 10,257,685 B1* | 4/2019 | Noorsumar | H04W 4/44 |
| 2005/0046584 A1* | 3/2005 | Breed | G06F 3/0237 |
| | | | 340/13.31 |
| 2005/0057350 A1* | 3/2005 | Younse | B60R 99/00 |
| | | | 340/457.1 |
| 2017/0295482 A1 | 10/2017 | Khan | |
| 2018/0079359 A1* | 3/2018 | Park | G08G 1/163 |
| 2020/0053537 A1 | 2/2020 | Klein | |
| 2020/0374680 A1 | 11/2020 | D'Addetta | |

FOREIGN PATENT DOCUMENTS

| | | |
|---|---|---|
| CN | 103632492 A | 3/2014 |
| CN | 107277791 A | 10/2017 |
| CN | 111512305 A | 8/2020 |
| DE | 102011112985 A1 | 3/2013 |
| JP | 2020169016 A | 10/2020 |

OTHER PUBLICATIONS

Office Action issued for counterpart Chinese Application 202210093779.0, issued by The State Intellectual Property Office of People's Republic of China dated May 20, 2023.

* cited by examiner

*Primary Examiner* — Omeed Alizada

(57) ABSTRACT

A communication control device comprises: a determination unit configured to determine whether a target has approached a mobile object based on information detected by a sensor mounted on the mobile object; and a communication control unit configured to control a communication unit that calls a call center based on a determination result by the determination unit, wherein the communication control unit causes transmission, to the call center, of first information relating to information detected at the mobile object while making a call connection to the call center, which is started in response to a call.

20 Claims, 9 Drawing Sheets

COMMUNICATION CONTROL DEVICE, MOBILE OBJECT, COMMUNICATION CONTROL METHOD, AND COMPUTER-READABLE STORAGE MEDIUM

The contents of the following Japanese patent application(s) are incorporated herein by reference: NO. 2021-038536 filed on Mar. 10, 2021.

BACKGROUND

1. Technical Field

The present invention relates to a communication control device, a mobile object, a communication control method, and a computer-readable storage medium.

2. Related Art

Patent Document 1 describes, when it is determined that a target object has collided with a subject vehicle based on an acceleration sensor for protecting occupants from front collision, which detects front collision to actuate an airbag or the like, notifying a center of the collision.

PRIOR ART DOCUMENT

Patent Document

Patent Document 1: Japanese Patent Application Publication No. 2020-169016

DESCRIPTION OF EXEMPLARY EMBODIMENTS

While the present invention will be described below by means of embodiments of the invention, these embodiments below are not intended to limit the invention defined by the claims. In addition, all combinations of features set forth in the embodiments are not necessarily essential to the solutions of the present invention.

Figure 1:
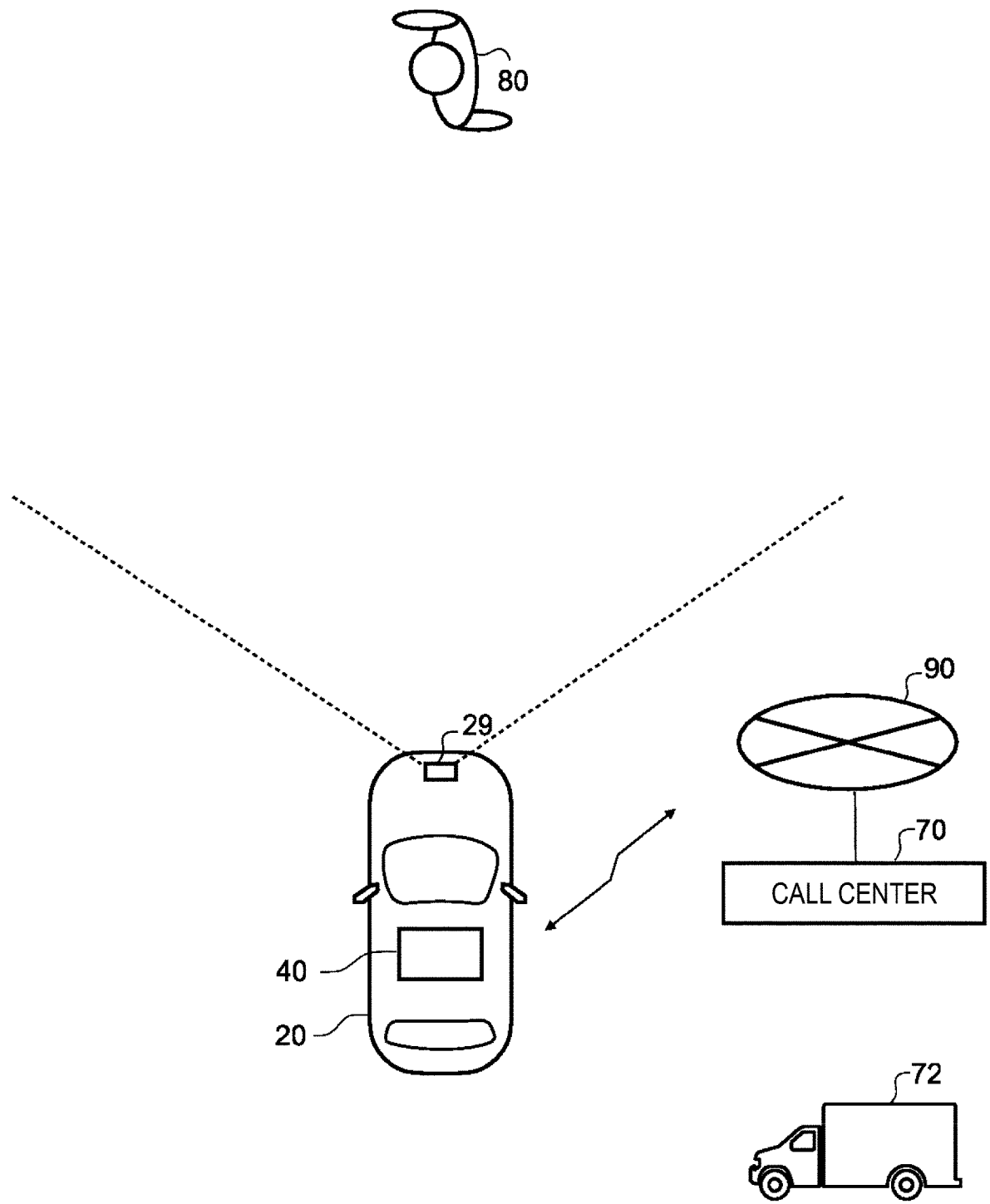
FIG. 1 schematically illustrates a usage scene of a report system 10 according to an embodiment.

FIG. 1 schematically illustrates a usage scene of a report system 10 according to an embodiment. The report system 10 comprises a vehicle 20 and a call center 70. The vehicle 20 is an example of a "mobile object". A pedestrian 80 is an example of a "target" to be recognized by the vehicle 20. The target may be any object other than the pedestrian 80.

The call center 70 is communicable with a control device 40 comprised in the vehicle 20 through a network 90. The network 90 is configured to include a communication line such as the Internet, a mobile communication network, and the like. A responder who responds to an occupant of the vehicle 20 is arranged in the call center 70. The call center 70 is configured to include a computer system that is used by the responder to speak over the phone with the occupant of the vehicle 20. In the present embodiment, in order to clarify the explanation, operations done by the computer system will be described as being performed by the call center 70. Note that the computer system according to the call center 70 may be implemented by a computer disposed in a particular location, and may be implemented by a so-called cloud computing.

The call center 70 requests, upon emergency, an administrator of an emergency vehicle 72 to dispatch the emergency vehicle 72 through the network 90. In the present embodiment, requesting the dispatch of the emergency vehicle 72 is referred to as an "emergency request". The call center 70 makes an emergency request in response to an instruction of the responder. The call center 70 makes an emergency request based on information detected at the vehicle 20. Note that the emergency vehicle 72 may be a vehicle for assisting the vehicle 20 or the pedestrian 80. The emergency vehicle 72 may be an emergency vehicle such as an ambulance, for example.

The vehicle 20 comprises a sensor 29 and a control device 40. The sensor 29 includes, for example, a camera for capturing images of the front of the vehicle 20, a sensor for detecting movement information or position information of the vehicle 20, such as a vehicle speed sensor and a yaw rate sensor, a sensor for acquiring operation information of the occupant of the vehicle 20 operating the vehicle 20, and the like. Note that each sensor comprised in the sensor 29 may be provided separately at different positions of the vehicle 20. For example, FIG. 1 illustrates a camera serving as a sensor comprised in the sensor 29, where the camera is shown located at the edge of the vehicle 20. However, the camera may be provided at any position where it can capture images of the front of the vehicle 20. The camera may be located at the top of a wind shield of the vehicle 20, at a ridge of a roof of the vehicle 20, on the roof of the vehicle 20, and the like. Positions of the sensors comprised in the sensor 29 are not limited to the edge of the vehicle 20 and the like. Each sensor comprised in the sensor 29 may be provided at any position.

When the vehicle 20 is running, the control device 40 continuously acquires images captured by the camera comprised in the sensor 29 to recognize the pedestrian 80 from the acquired images. From the images captured by the camera comprised in the sensor 29, the control device 40 determines whether the pedestrian 80 has approached the vehicle 20 to be within a predetermined distance. If it is determined that the pedestrian 80 has approached the vehicle 20, the control device 40 transmits call information for the call center 70 to allow the occupant of the vehicle 20 to speak over the phone with the responder of the call center 70. Moreover, the control device 40 transmits, to the call center 70 along with the call information for the call center 70, vehicle speed information which is detected by the vehicle speed sensor when it is determined that the pedestrian 80 has approached the vehicle 20.

In response to the call information from the vehicle 20, the call center 70 performs control to establish a call connection with the control device 40 for the responder of the call center 70 to speak over the phone with the occupant of the vehicle 20. When the responder and the occupant actually start speaking over the phone through the call connection, the responder determines whether to dispatch the emergency vehicle 72 from speaking with the occupant. In response to the determination by the responder, the call center 70 makes an emergency request to dispatch the emergency vehicle 72. On the other hand, if the responder and the occupant cannot start speaking over the phone, the call center 70 uses information detected at the vehicle 20 after it is determined that the pedestrian 80 has approached the vehicle 20 to determine whether to make an emergency request to dispatch the emergency vehicle 72.

Figure 2:
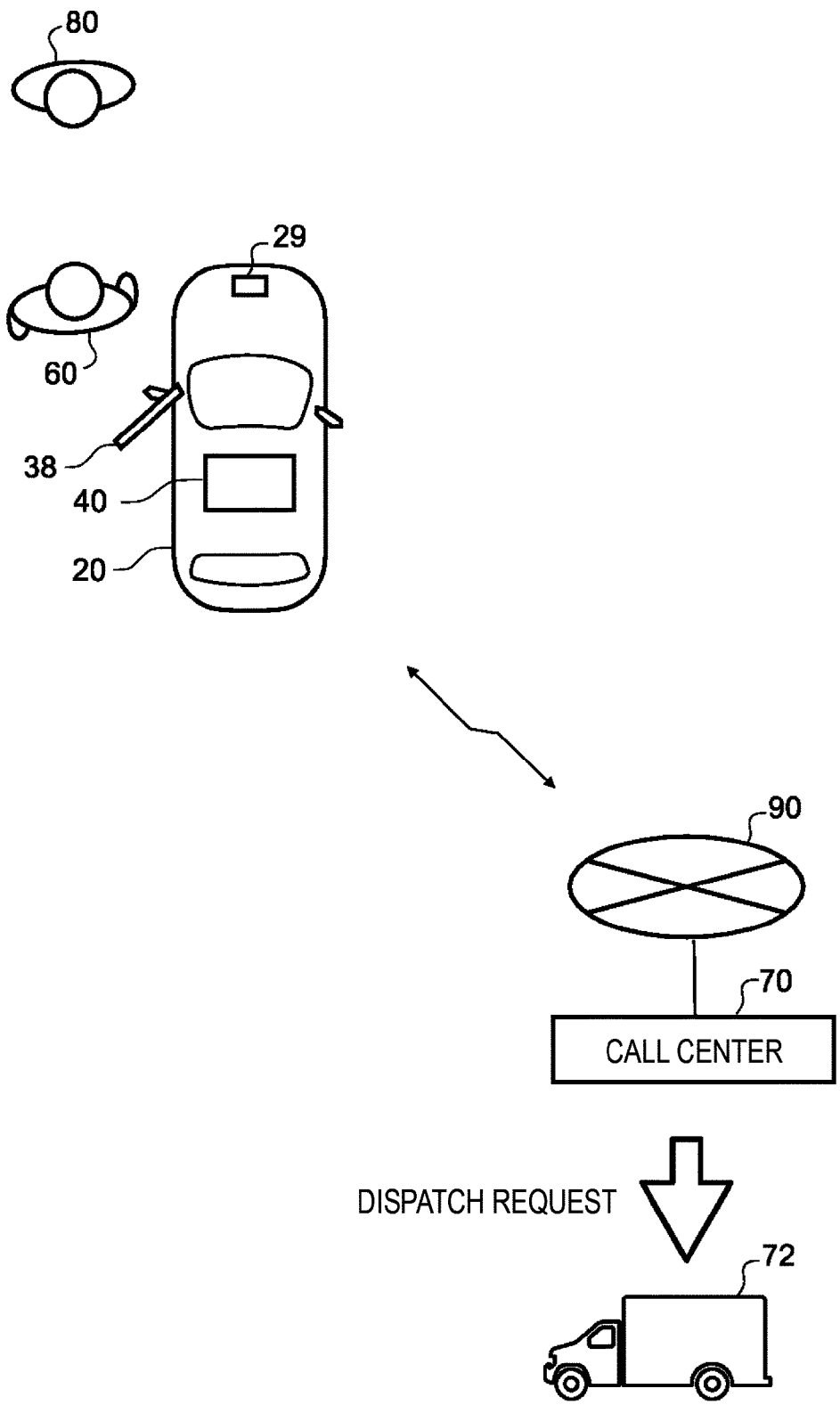
FIG. 2 schematically illustrates an exemplary situation in which a call center 70 determines to make an emergency request.

FIG. 2 schematically illustrates an exemplary situation in which the call center 70 determines to make an emergency request. The control device 40 transmits, in response to the request from the call center 70 or voluntarily, information based on data detected by various sensors comprised in the sensor 29 to the call center 70. For example, even when the responder cannot speak over the phone with the occupant 60, the call center 70 makes an emergency request to dispatch the emergency vehicle 72 if it is determined that the vehicle 20 is stopped based on the current vehicle speed information transmitted from the control device 40. Moreover, when it is determined that the vehicle 20 is stopped and that the occupant 60 has performed an operation to open a door 38 from information of a door sensor included in the sensor 29, the call center 70 determines that the occupant 60 may have left the vehicle and makes an emergency request to dispatch the emergency vehicle 72. For example, when the occupant of the vehicle 20 has left the vehicle and is performing a rescue operation of the pedestrian 80, the responder of the call center 70 may not be able to speak over the phone with the occupant 60. Even in such a case, the call center 70 can make an emergency request appropriately based on the information transmitted from the control device 40 to the call center 70.

On the other hand, in a case where the vehicle speed of the vehicle 20 when approaching transmitted from the control device 40 along with the call information from the control device 40 is below a predetermined value, if the current vehicle speed of the vehicle 20 is equal to or higher than a predetermined threshold, the call center 70 determines that the vehicle 20 continues running and does not make an emergency request to dispatch the emergency vehicle 72. This can reduce the possibility that the emergency vehicle 72 is dispatched unnecessarily when the vehicle 20 continues running without any trouble.

Figure 3:
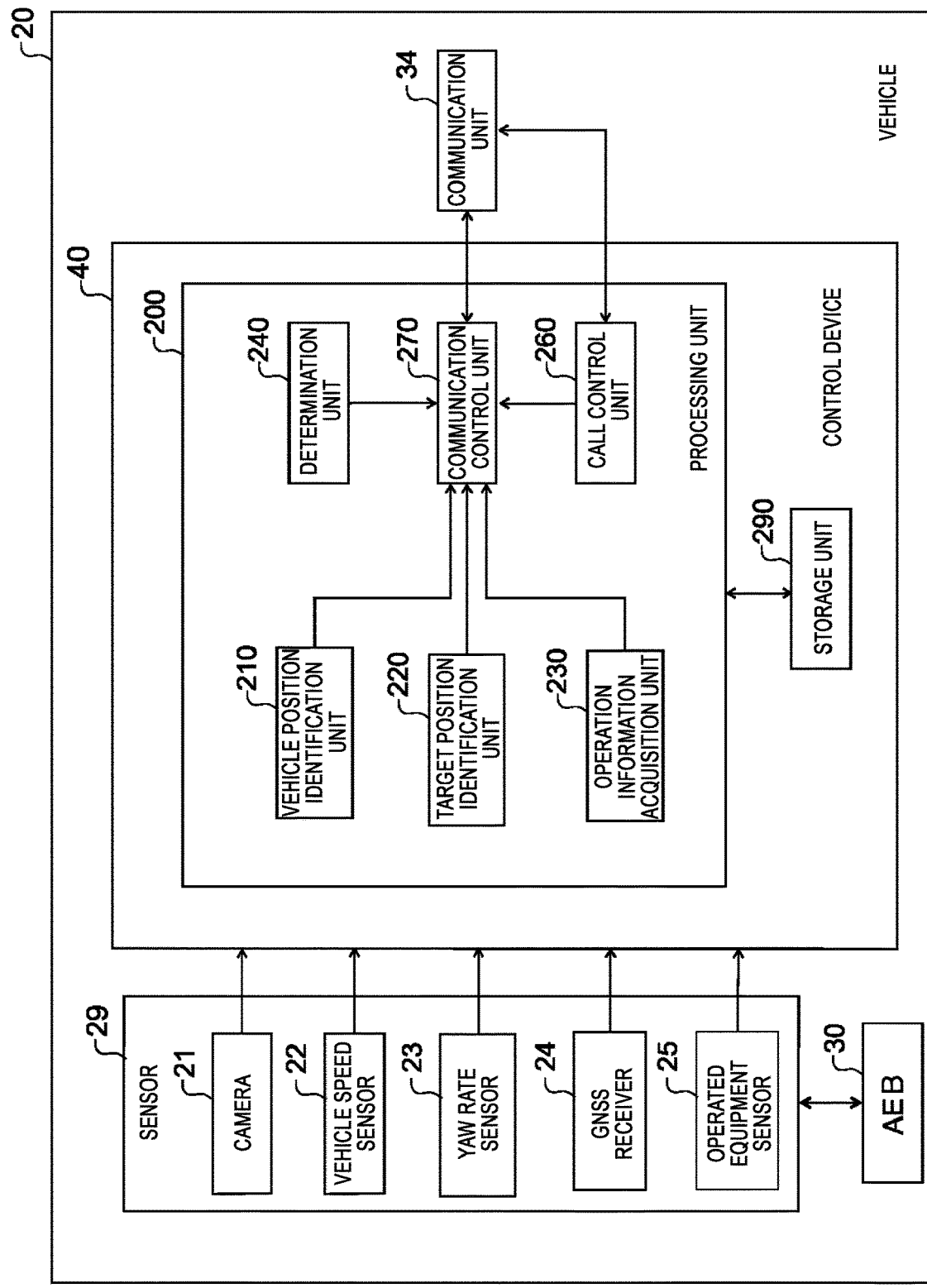
FIG. 3 illustrates a system configuration of a vehicle 20.

FIG. 3 illustrates a system configuration of the vehicle 20. The vehicle 20 comprises the sensor 29, a communication unit 34, the control device 40, and an AEB 30. The communication unit 34 communicates with the call center 70 through the network 90. Moreover, the communication unit 34 is responsible for the speaking over the pone between the occupant 60 and the responder of the call center 70.

The sensor 29 comprises a camera 21, a vehicle speed sensor 22, a yaw rate sensor 23, a GNSS receiver 24, and an operated equipment sensor 25. The camera 21 is an example of an image capturing unit that captures images in the running direction of the vehicle 20 to generate image information. The image information generated by the camera 21 may be stored in a storage unit 290 at least temporarily. The vehicle speed sensor 22 is mounted to a transmission or the like and generates information that indicates a vehicle speed of the vehicle 20. The yaw rate sensor 23 generates information that indicates a yaw rate of the vehicle 20. The GNSS receiver 24 receives radio waves from a GNSS satellite to generate position information. The operated equipment sensor 25 is a sensor to detect operation information for equipment that is operated directly or indirectly by the occupant 60. The equipment operated by the occupant 60 may include, for example, an accelerator pedal, a brake pedal, a brake lever, a shift lever, a seat belt, a door lock, a door, and the like. The operated equipment sensor 25 may detect information that indicates an operation amount of the accelerator pedal, an operation amount of the brake pedal, an operation amount of the brake lever, position information of the shift lever, status information of the seat belt, status information of the door lock, an open/close status of the door, and the like.

The AEB 30 is an Autonomous Emergency Braking system. The AEB 30 performs automatic braking based on at least partial information detected by the sensor 29.

The control device 40 is an example of a communication control device. The control device 40 comprises a processing unit 200 and a storage unit 290. The processing unit 200 is implemented by a computational processing device including a processor, for example. The storage unit 290 is implemented by comprising a non-volatile storage medium. The processing unit 200 performs processing using information stored in the storage unit 290. The processing unit 200 may be implemented by an ECU (Electronic Control Unit) that comprises a microcomputer comprising a CPU, a ROM, a RAM, an I/O, a bus, and the like.

The processing unit 200 comprises a vehicle position identification unit 210, a target position identification unit 220, an operation information acquisition unit 230, a determination unit 240, a call control unit 260, and a communication control unit 270. The vehicle position identification unit 210 acquires a position of the vehicle 20. It may acquire the position of the vehicle 20 based on the vehicle speed information detected consecutively by the vehicle speed sensor 22 and temporal information. The vehicle position identification unit 210 may acquire the position of the vehicle 20 based on the position information generated by the GNSS receiver 24. The target position identification unit 220 identifies a position of the pedestrian 80. The target position identification unit 220 may identify the position of the pedestrian 80 at least using the image information acquired by the camera 21. The target position identification unit 220 may identify the position of the pedestrian 80 in the advancing direction of the vehicle 20 at least using the image information acquired by the camera 21. The target position identification unit 220 may identify a distance from the vehicle 20 to the pedestrian 80 based on a temporal change in the size of a figure of the pedestrian 80 in the image information acquired by the camera 21. The operation information acquisition unit 230 acquires operation information of the vehicle 20 by the occupant 60 based on the information detected by the operated equipment sensor 25.

The target position identification unit 220 may recognize the figure of the pedestrian 80 from the image acquired by the camera 21 and, based on the position information of the recognized figure of the pedestrian 80 in the image, identify the position information of the pedestrian 80 in the direction intersecting the moving direction of the vehicle 20. The direction intersecting the moving direction of the vehicle 20 may be a direction perpendicular to the moving direction of the vehicle 20, for example. Note that, in the present embodiment, in order to clarify the explanation, the direction intersecting the moving direction of the vehicle 20 may be referred to as a "transverse direction", and the position information of the pedestrian 80 in the direction intersecting the moving direction of the vehicle 20 may be referred to as "transverse position information". The target position identification unit 220 may identify the transverse position information of the vehicle 20 from a series of yaw rate information acquired consecutively by the yaw rate sensor 23 and the vehicle speed information of the vehicle 20. The target position identification unit 220 may calculate a moving speed in the transverse direction of the pedestrian 80 based on the transverse position information of the pedestrian 80 identified from the image information acquired consecutively and time of acquisition of the image information. The target position identification unit 220 may identify the transverse position information of the pedestrian 80 based on the moving speed in the transverse direction of the pedestrian 80 and elapsed time. The target position identification unit 220 may identify relative transverse direction information between the vehicle 20 and the pedestrian 80 based on the transverse position information of the pedestrian 80 identified from the image information, as well as the transverse position information of the vehicle 20 identified from the yaw rate information and the vehicle speed information.

The communication control unit 270 controls communication by the communication unit 34. For example, the communication control unit 270 performs control of data communication by the communication unit 34 over the network 90. The call control unit 260 is responsible for control when a voice call is made by the occupant 60 with the call center 70.

The determination unit 240 determines whether the pedestrian 80 has approached the vehicle 20 based on the information detected by the sensor mounted on the vehicle 20. For example, the determination unit 240 may extract a figure of the pedestrian 80 from the image information acquired by the camera 21 and, based on the extracted figure of the pedestrian 80, determine whether the pedestrian 80 has approached the vehicle 20. The determination unit 240 may determine whether the pedestrian 80 has approached the vehicle 20 based on the position information of the vehicle 20 identified by the vehicle position identification unit 210 and the position information of the pedestrian 80 identified by the target position identification unit 220. The communication control unit 270 controls the communication unit 34 that calls the call center 70 based on a determination result by the determination unit 240. For example, the communication control unit 270 performs control for calling the call center 70 when it is determined that the pedestrian 80 has approached the vehicle 20. The communication control unit 270 causes transmission of first information relating to the information detected at the vehicle 20 to the call center 70 while making the call connection to the call center 70, which is started in response to a call.

Note that, in the present embodiment, it is determined that the pedestrian 80 has "approached" the vehicle 20 when it can be determined that the distance between the vehicle 20 and the pedestrian 80 is shorter than a predetermined distance. The concept of "approached" includes a state where the distance between the vehicle 20 and the pedestrian 80 is substantially zero, meaning that they are substantially in contact with each other. Whether the pedestrian 80 has "approached" the vehicle 20 can be determined based on the information detected at various sensors (e.g., acceleration sensor) that detect that the pedestrian 80 has contacted the vehicle 20.

The communication control unit 270, at the time of the call, causes transmission of second information including information different from the first information to the call center 70. The first information and the second information may include at least different kinds of information. For example, the second information is at least either of the identification information of the vehicle 20 and the moving speed of the vehicle 20 when the determination unit 240 determines that the pedestrian 80 has approached the vehicle 20, and the first information may include the information detected at the vehicle 20 while making the call connection.

The communication control unit 270 calls the call center 70 when the determination unit 240 determines that the pedestrian 80 has approached the vehicle 20, and causes transmission of the first information when a speech by the occupant 60 of the vehicle 20 is not detected after the determination unit 240 determines that the pedestrian 80 has approached the vehicle 20. On the other hand, the communication control unit 270 does not cause transmission of the first information when the speech by the occupant 60 of the vehicle 20 is detected. The communication control unit 270 may acquire, through the call control unit 260, information that indicates whether the speech is detected. Note that the sensor 29 comprises a voice sensor for detecting a voice of the occupant 60, and the communication control unit 270 may detect the speech by the occupant 60 based on information detected by the voice sensor.

The first information may include information indicating whether the occupant 60 in the vehicle 20 is present, which is detected at the vehicle 20 after the determination unit 240 determines that the pedestrian 80 has approached the vehicle 20. The first information may include the operation information of the vehicle by the occupant 60 of the vehicle 20, which is detected at the vehicle 20 after the determination unit 240 determines that the pedestrian 80 has approached the vehicle 20.

The first information may include information indicating the moving speed of the vehicle 20, which is detected at the vehicle 20 after the determination unit 240 determines that the pedestrian 80 has approached the vehicle 20. The first information may include information indicating the position information of the vehicle 20, which is detected at the vehicle 20 after the determination unit 240 determines that the pedestrian 80 has approached the vehicle 20. The first information may include the image information acquired by the camera 21 mounted on the vehicle 20 after the determination unit 240 determines that the pedestrian 80 has approached the vehicle 20. The first information may include the image information acquired by the camera 21 mounted on the vehicle 20 before the determination unit 240 determines that the pedestrian 80 has approached the vehicle 20. The first information may include information detected at the vehicle 20 before and after the determination unit 240 determines that the pedestrian 80 has approached the vehicle 20.

The first information may include the position information of the pedestrian 80 in the direction intersecting the moving direction of the vehicle 20, which is detected at the vehicle 20 when the determination unit 240 determines that the pedestrian 80 has approached the vehicle 20. The first information may further include the position information of the vehicle 20 after the determination unit 240 determines that the pedestrian 80 has approached the vehicle 20.

Figure 4:
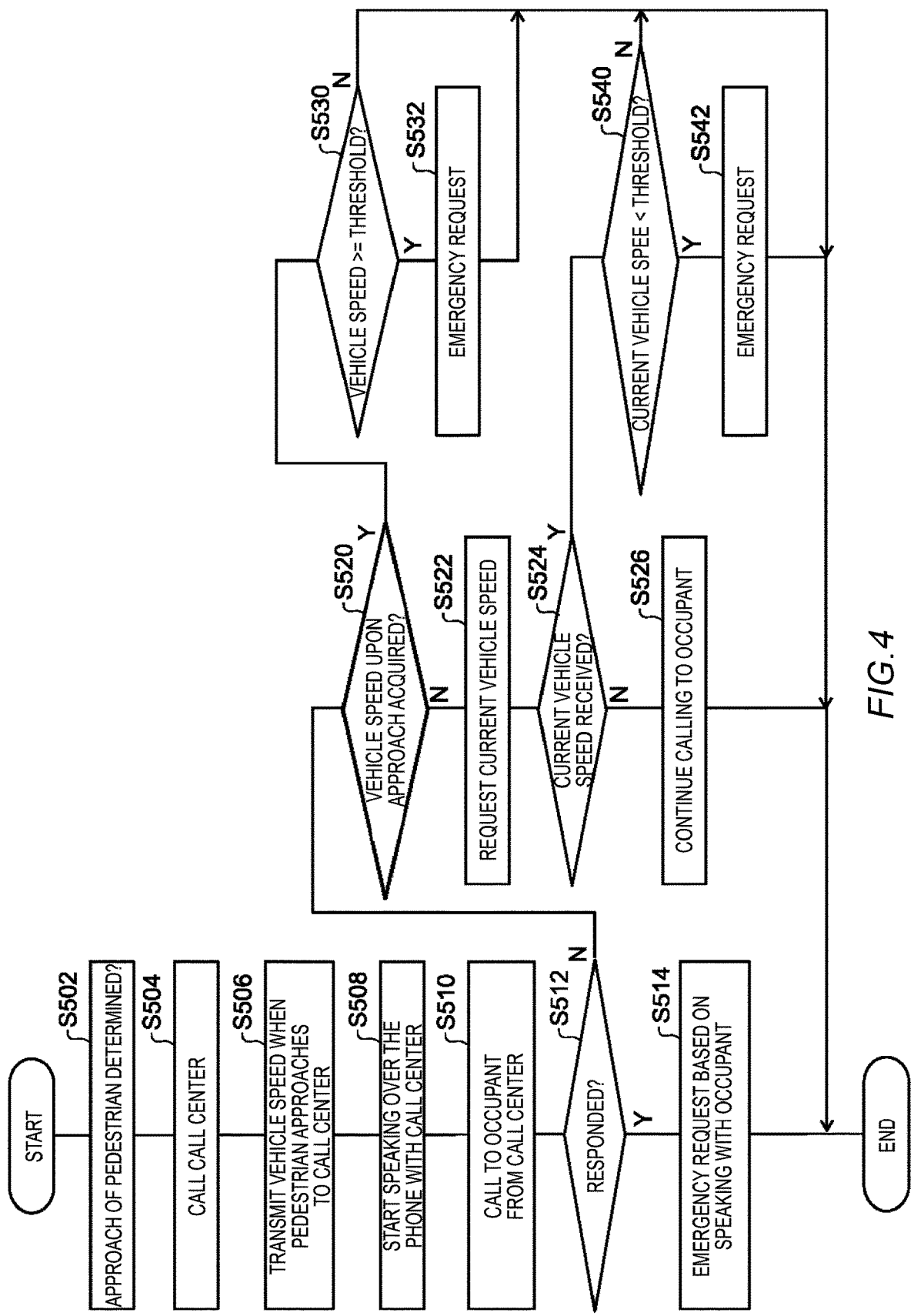
FIG. 4 illustrates a first processing procedure performed by a control device 40 and the call center 70 in a flow chart format.

FIG. 4 illustrates a first processing procedure performed by the control device 40 and the call center 70 in a flow chart format. At S502, the determination unit 240 of the control device 40 determines that the vehicle 20 and the pedestrian 80 have approached each other. For example, the determination unit 240 determines that the vehicle 20 and the pedestrian 80 have approached each other based on the figure of the pedestrian 80 extracted from the image captured by the camera 21. For example, the determination unit 240 may calculate the distance from the vehicle 20 to the pedestrian 80 based on a temporal change rate per unit time in the size of the figure of the pedestrian 80 extracted from the image, the vehicle speed of the vehicle 20, a focal length of the camera 21, and the like, and when the calculated distance becomes shorter than a predetermined value, determine that the vehicle 20 and the pedestrian 80 have approached each other. Note that it may receive a current position of a mobile terminal from the mobile terminal carried by the pedestrian 80 through the communication unit 34 and, based on the distance between the current position of the vehicle 20 detected at the GNSS receiver 24 and the current position of the mobile terminal, determine that the vehicle 20 and the pedestrian 80 have approached each other.

At S504, the communication control unit 270 controls the communication unit 34 to transmit the call information to the call center 70. For example, the communication control unit 270 may make a call to the call center 70. The communication control unit 270 may transmit information to request making a call from the call center 70 to the communication unit 34. At S506, the communication control unit 270 controls the communication unit 34 to transmit the vehicle speed information of the vehicle 20 detected by the vehicle speed sensor 22 when it is determined that the pedestrian 80 has approached at S502, along with the identification information of the vehicle 20, to the call center 70. At S508, the call connection is established between the call center 70 and the communication unit 34, enabling the responder of the call center 70 to speak over the phone with the occupant 60.

At S510, the responder of the call center 70 calls to the occupant 60, and at S512, the call center 70 determines whether the occupant 60 has responded. If it is determined that the occupant 60 has responded at S512, at S514, the responder of the call center 70 speaks with the occupant 60 and, based on the content of speaking with the occupant 60, makes an emergency request for requesting the dispatch of the emergency vehicle 72. Moreover, the determination at S512 may be performed by the responder of the call center 70, wherein the call center 70 may determine based on voice information transmitted by the communication unit 34 at the call center 70.

If it is determined that the occupant 60 has not responded at S512, at S520, the call center 70 determines whether the vehicle speed information transmitted at S506 has been acquired successfully at the call center 70. If the vehicle speed information transmitted from the communication unit 34 at S506 has been acquired successfully at the call center 70, at S530, the call center 70 determines, based on the vehicle speed information transmitted at S506, whether the vehicle speed of the vehicle 20 when the pedestrian 80 approaches is equal to or higher than the predetermined threshold. Note that the threshold used in the determination at S530 is a threshold that is preset for determining whether an ambulance dispatch will be required for the pedestrian 80. If the vehicle speed of the vehicle 20 when the pedestrian 80 approaches is equal to or higher than the threshold, the emergency request is made for the emergency vehicle 72 (S532), and the process is terminated. If the vehicle speed of the vehicle 20 when the pedestrian 80 approaches is lower than the threshold, it is determined that the emergency request is not required and the process is terminated without making the emergency request.

At S520, if the vehicle speed information transmitted at S506 has not been acquired successfully at the call center 70, the call center 70 requests the vehicle 20 for the current vehicle speed. When the control device 40 receives the request for the vehicle speed from the call center 70, the communication control unit 270 controls the communication unit 34 to transmit the information indicating the current vehicle speed detected by the vehicle speed sensor 22 to the call center 70. At S524, the call center 70 determines whether the current vehicle speed of the vehicle 20 is received successfully. If the current vehicle speed of the vehicle 20 is not received successfully, at S526, the call center 70 maintains the call connection with the communication unit 34, and the responder of the call center 70 continues calling to the occupant 60.

If it is determined that the current vehicle speed of the vehicle 20 is received successfully at S524, at S540, the call center 70 determines whether the current vehicle speed of the vehicle 20 is lower than the predetermined threshold. Note that the threshold applied to the determination at S540 is a threshold that is preset for determining whether the vehicle 20 is stopped. If it is determined that the current vehicle speed of the vehicle 20 is lower than the predetermined threshold at S540, at S542, the call center 70 makes the emergency request for requesting the dispatch of the emergency vehicle 72. In this way, the call center 70 can make the emergency request even when the speaking between the occupant 60 and the responder of the call center 70 fails to be established. Thus, the emergency request can be made immediately. If it is determined that the current vehicle speed of the vehicle 20 is equal to or higher than the predetermined threshold at S540, it is determined that the vehicle 20 continues running normally and the emergency request is not required, so that the process is terminated without making the emergency request.

In this manner, according to the first processing procedure, the control device 40 transmits the current vehicle speed information of the vehicle 20 to the call center 70, so that the call center 70 can appropriately determine whether the vehicle 20 is stopped at the scene even when the occupant 60 cannot speak with the responder of the call center 70. As such, the dispatch of the emergency vehicle 72 can be requested promptly even when the occupant 60 cannot speak with the responder of the call center 70.

Figure 5:
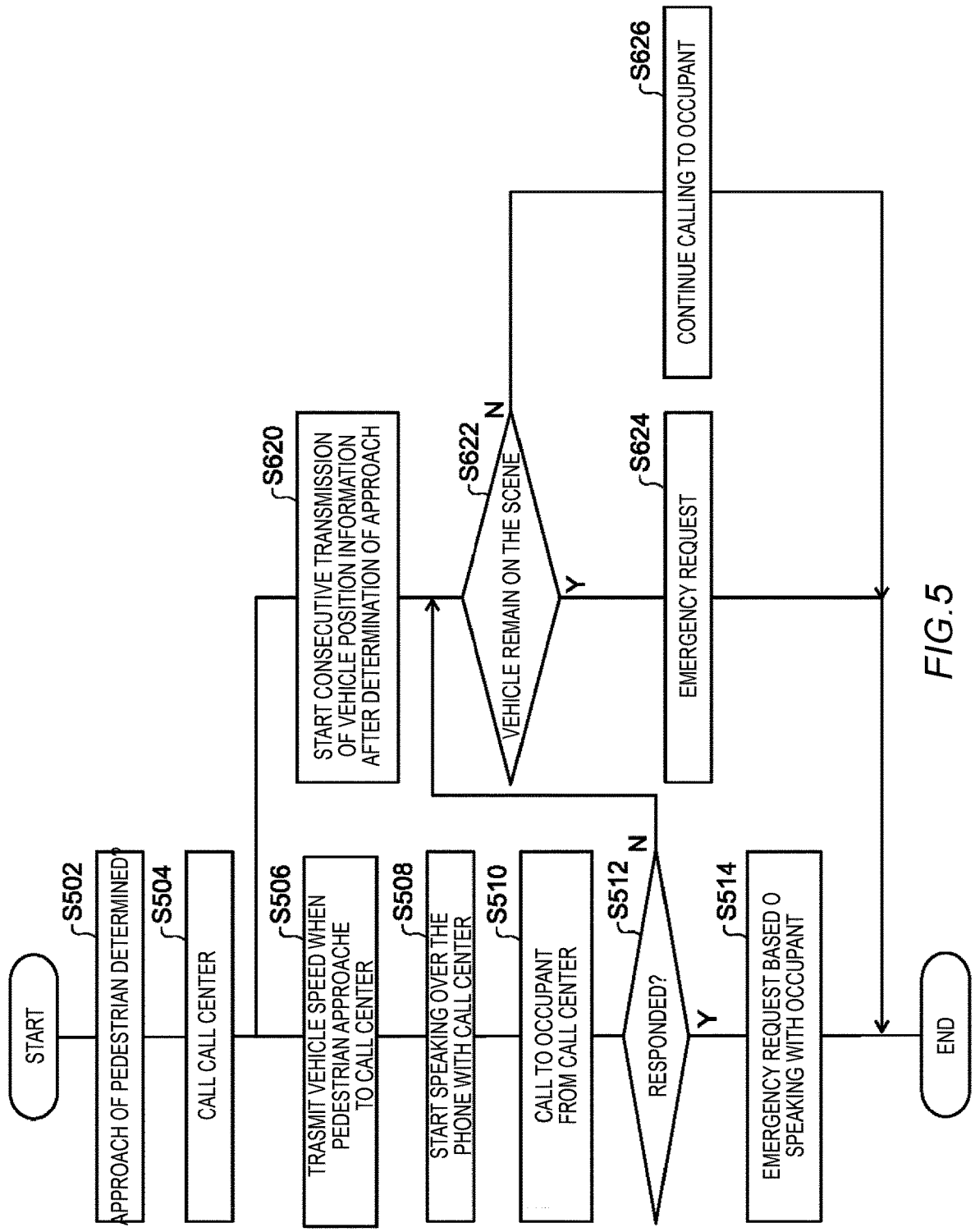
FIG. 5 illustrates a second processing procedure performed by the control device 40 and the call center 70 in a flow chart format.

FIG. 5 illustrates a second processing procedure performed by the control device 40 and the call center 70 in a flow chart format. In the flow chart shown in FIG. 5, the process from S502 to S514 is identical to the process from S502 to S514 in FIG. 4 and thus its description is omitted, while the differences with the flow chart in FIG. 4 will be described.

After the communication control unit 270 makes the call to the call center 70 at S504, at S620, the communication control unit 270 starts the processing to consecutively transmit the vehicle position information of the vehicle 20 after the determination that the vehicle 20 has approached the pedestrian 80, in parallel with the processing at S506 and thereafter. For example, the communication control unit 270 may repeat the process to acquire the information indicating the position of the vehicle 20 at predetermined time intervals and to transmit the acquired information indicating the vehicle position to the call center 70 through the communication unit 34. The information indicating the position of the vehicle 20 may be information calculated based on the vehicle speed, which is detected consecutively at the vehicle speed sensor 22, and the detected time. The information indicating the position of the vehicle 20 may be position information generated at the GNSS receiver 24.

If it is determined that the occupant 60 has not responded at S512, the process proceeds to S622. At S622, the call center 70 determines whether the vehicle 20 remains in the location where it has approached the pedestrian 80. For example, when it is determined that, based on the position information transmitted consecutively from the vehicle 20, an amount of change in the position of the vehicle 20 after the approach of the pedestrian 80 is lower than a predetermined value, the call center 70 determines that the vehicle 20 remains in the location where it has approached the pedestrian 80. If it is determined that the vehicle 20 remains in the location where it has approached the pedestrian 80 at S622, at S624, the call center 70 makes the emergency request for the emergency vehicle 72 and the process is terminated. If it is determined that the vehicle 20 does not remain in the location where it has approached the pedestrian 80 at S622, at S626, the call center 70 maintains the call connection with the communication unit 34, and the responder of the call center 70 continues calling to the occupant 60.

In this manner, according to the second processing procedure, the control device 40 transmits the position information of the vehicle 20 after the approach of the pedestrian 80 to the call center 70, so that the call center 70 can determine whether the vehicle 20 remains at the scene. As such, the dispatch of the emergency vehicle 72 can be requested promptly even when the occupant 60 cannot speak with the responder of the call center 70. Moreover, unnecessary dispatching of the emergency vehicle 72 can be reduced.

Figure 6:
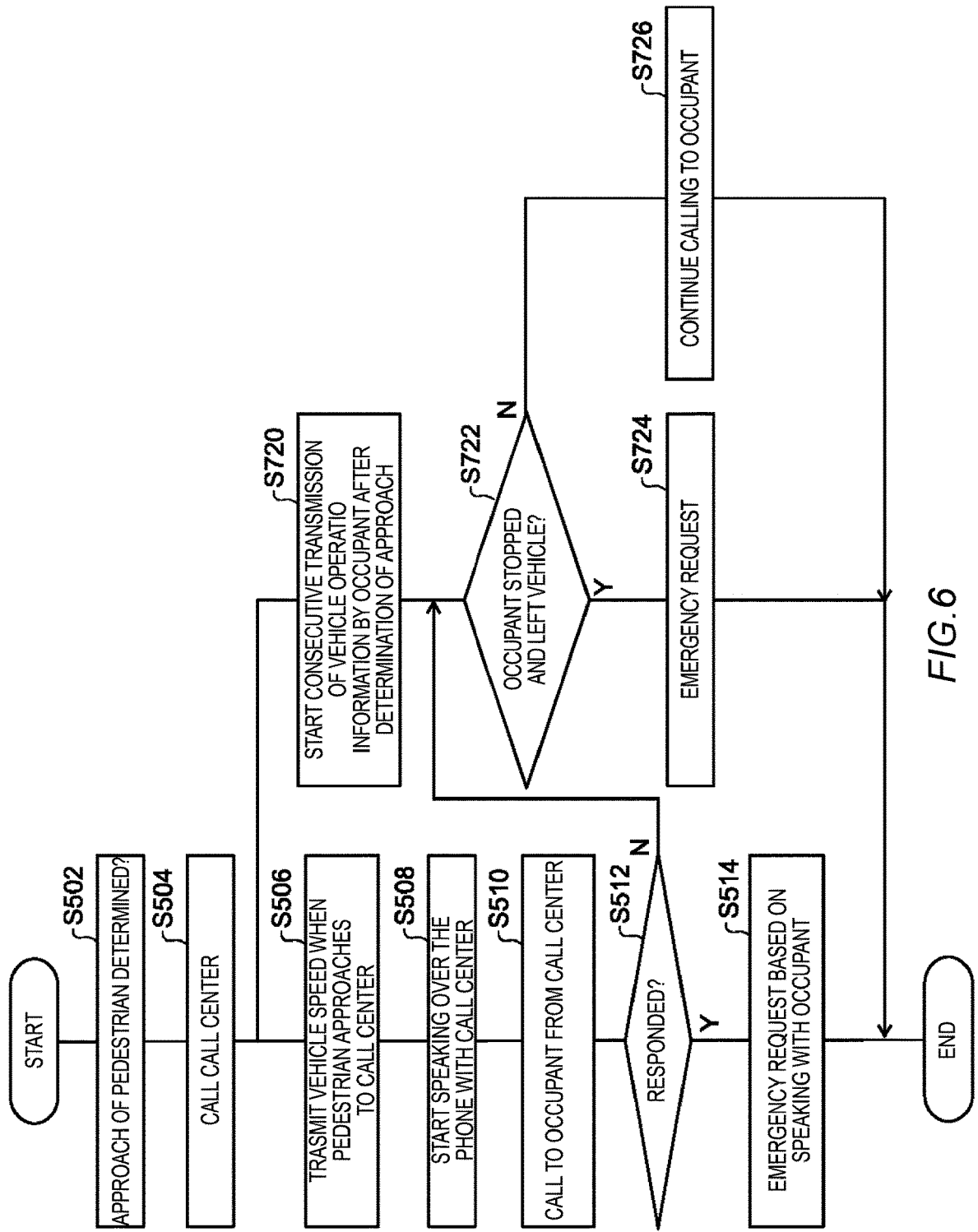
FIG. 6 illustrates a third processing procedure performed by the control device 40 and the call center 70 in a flow chart format.

FIG. 6 illustrates a third processing procedure performed by the control device 40 and the call center 70 in a flow chart format. In the flow chart shown in FIG. 6, the process from S502 to S514 is identical to the process from S502 to S514 in FIG. 4 and thus its description is omitted, while the differences with the flow chart in FIG. 4 will be described.

After the communication control unit 270 makes the call to the call center 70 at S504, at S720, the communication control unit 270 starts processing to consecutively transmit the operation information of the occupant 60 having operated the vehicle 20 after the determination that the vehicle 20 has approached the pedestrian 80, in parallel with the processing at S506 and thereafter. For example, the communication control unit 270 may repeat the process to acquire the information detected at the operated equipment sensor 25 at predetermined time intervals and to transmit the acquired operation information to the call center 70 through the communication unit 34. The operation information may be operation information of the accelerator pedal by the occupant 60, operation information of the brake pedal or the brake lever by the occupant 60, operation information of the shift lever by the occupant 60, release information of the seat belt by the occupant 60, release information of the door lock by the occupant 60, open/close operation information of the door 38 by the occupant 60, and the like.

If it is determined that the occupant 60 has not responded at S512, the process proceeds to S722. At S722, the call center 70 determines whether the occupant 60 has stopped and left the vehicle 20. For example, based on a series of the operation information transmitted consecutively from the vehicle 20, the call center 70 may determine whether an operation to ease up on the accelerator pedal has been performed, whether an operation to step on the brake pedal has been performed, whether an operation to pull the brake lever has been performed, whether an operation to put the shift lever into the park position has been performed, whether an operation to release the seat belt has been performed, whether an operation to release the door lock has been performed, whether an operation to open the door 38 has been performed, and the like, respectively, so as to determine whether the occupant 60 has stopped and left the vehicle 20 based on the determination results of each of the operations. If it is determined that the occupant 60 has stopped and left the vehicle 20 at S722, at S724, the call center 70 makes the emergency request for the emergency vehicle 72 and the process is terminated. If it is determined that the occupant 60 has not stopped and left the vehicle 20 at S722, at S726, the call center 70 maintains the call connection with the communication unit 34, and the responder of the call center 70 continues calling to the occupant 60.

In this manner, according to the third processing procedure, the control device 40 transmits the operation information by the occupant 60 after the approach of the pedestrian 80 to the call center 70, so that the call center 70 can appropriately determine whether the occupant 60 has left the vehicle. As such, the dispatch of the emergency vehicle 72 can be requested promptly even when the occupant 60 cannot speak with the responder of the call center 70. Moreover, unnecessary dispatching of the emergency vehicle 72 can be reduced.

Figure 7:
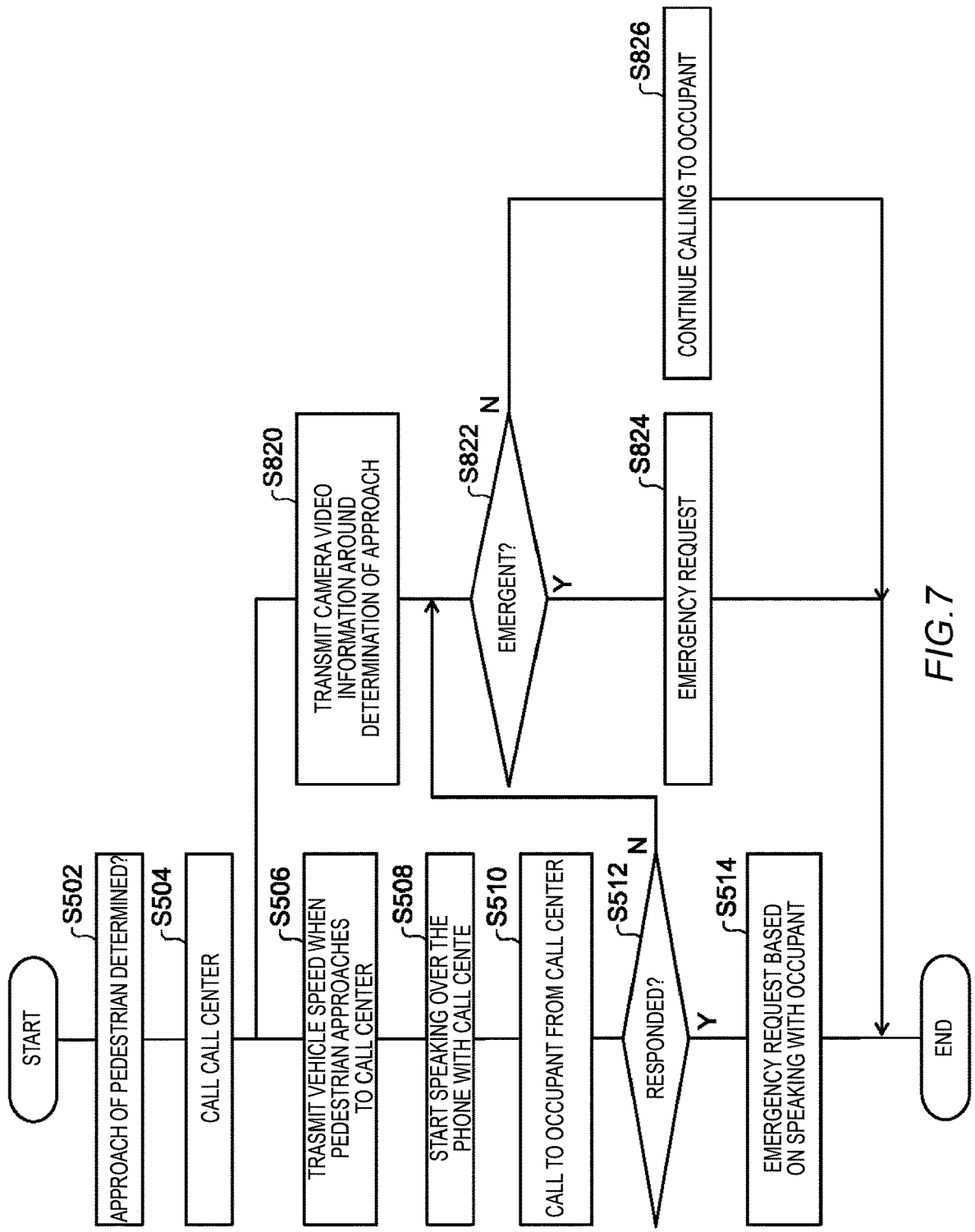
FIG. 7 illustrates a fourth processing procedure performed by the control device 40 and the call center 70 in a flow chart format.

FIG. 7 illustrates a fourth processing procedure performed by the control device 40 and the call center 70 in a flow chart format. In the flow chart shown in FIG. 7, the process from S502 to S514 is identical to the process from S502 to S514 in FIG. 4 and thus its description is omitted, while the differences with the flow chart in FIG. 4 will be described.

After the communication control unit 270 makes the call to the call center 70 at S504, at S820, the processing is performed to transmit the image information acquired by the camera 21 at time slots before and after the approach of the pedestrian 80, in parallel with the processing at S506 and thereafter. For example, the communication control unit 270 acquires, from the storage unit 290, the image information captured during a period from a predetermined timing before the approach of the pedestrian 80 to the present and stored in the storage unit 290, and causes the image information acquired from the storage unit 290 to be transmitted to the call center 70. Moreover, the communication control unit 270 may repeat the processing to transmit the image information which is acquired sequentially by the camera 21 to the call center 70.

If it is determined that the occupant 60 has not responded at S512, the process proceeds to S822. At S822, the call center 70 determines whether it is emergent based on the image information transmitted from the control device 40. For example, the responder of the call center 70 may recognize a state of the pedestrian 80 from the image information to determine whether it is required to emergently dispatch the emergency vehicle 72. As an example, if it can be determined from the image information that the vehicle 20 continues running in a normal condition, it can be determined that it is not emergent. Note that the determination of emergency may be performed by a computer system at the call center 70. If it is determined that it is emergent at S822, at S824, the call center 70 makes the emergency request for the emergency vehicle 72 and the process is terminated. If it is determined that it is not emergent at S822, at S826, the call center 70 maintains the call connection with the communication unit 34, and the responder of the call center 70 continues calling to the occupant 60.

In this manner, according to the fourth processing procedure, the control device 40 transmits the image information before and after the approach of the pedestrian 80 to the call center 70, so that the call center 70 can appropriately determine whether it is emergent based on the image information. As such, the dispatch of the emergency vehicle 72 can be requested promptly even when the occupant 60 cannot speak with the responder of the call center 70. Moreover, unnecessary dispatching of the emergency vehicle 72 can be reduced.

Figure 8:
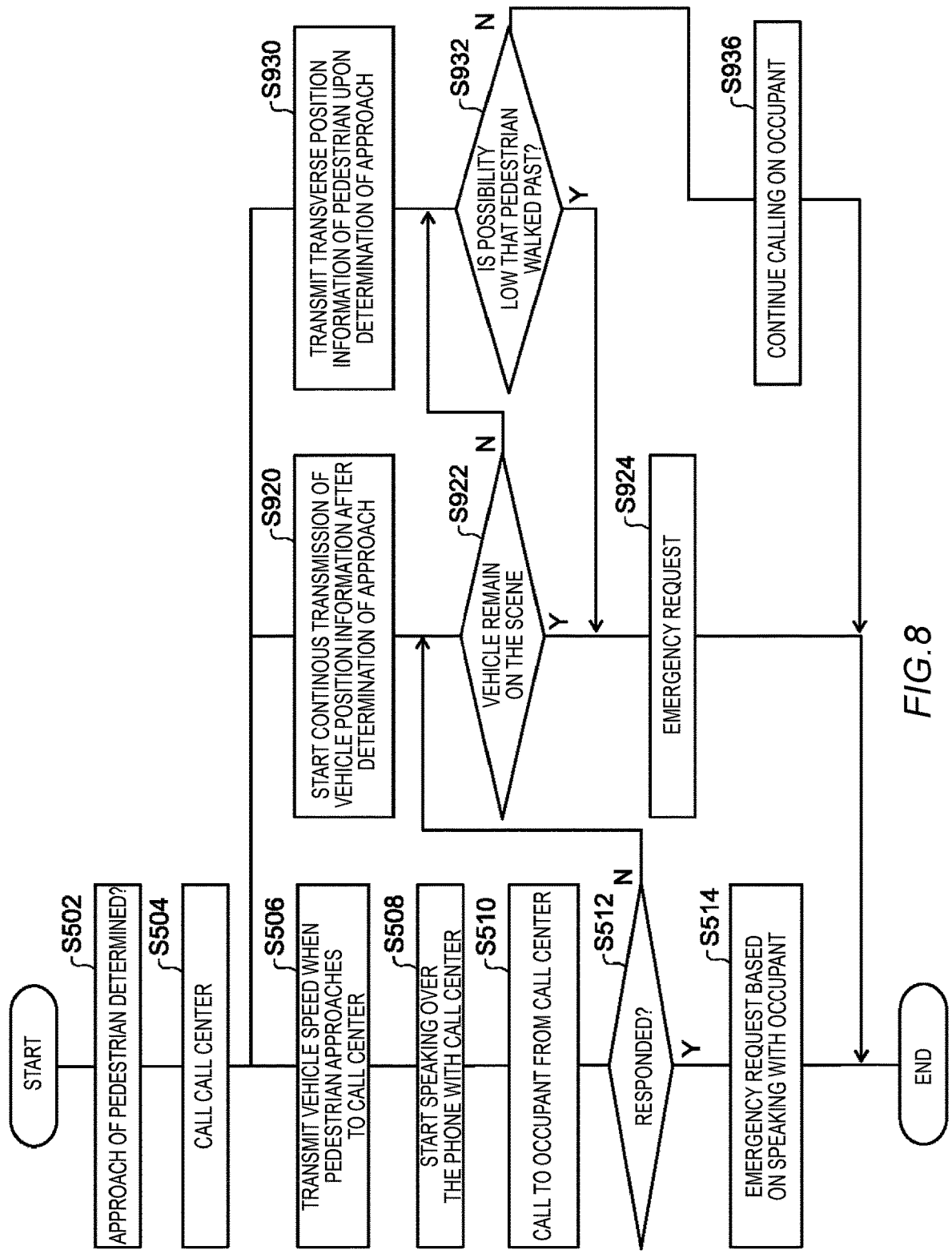
FIG. 8 illustrates a fifth processing procedure performed by the control device 40 and the call center 70 in a flow chart format.

FIG. 8 illustrates a fifth processing procedure performed by the control device 40 and the call center 70 in a flow chart format. In the flow chart shown in FIG. 8, the process from S502 to S514 is identical to the process from S502 to S514 in FIG. 4 and thus its description is omitted, while the differences with the flow chart in FIG. 4 will be described.

After the communication control unit 270 makes the call to the call center 70 at S504, at S920, the processing is started to consecutively transmit the vehicle position information of the vehicle 20 after the determination that the vehicle 20 has approached the pedestrian 80, in parallel with the processing at S506 and thereafter. The processing at S920 may be similar to the processing at S620 in FIG. 5. Moreover, the communication control unit 270, after making the call to the call center 70, at S930, transmits the transverse position information of the pedestrian 80 upon determination that the vehicle 20 has approached the pedestrian 80, in parallel with the processing at S506 and thereafter. The transverse position information of the pedestrian 80 may be information indicating a relative position between the position of the vehicle 20 and the position of the pedestrian 80 in the transverse direction. For example, the target position identification unit 220 may identify the transverse position of the pedestrian 80 based on the position of the figure of the pedestrian 80 in the image extracted from the image information acquired from the camera 21. Moreover, the target position identification unit 220 may identify continuously the position in the transverse direction of the vehicle 20 based on the information acquired continuously by the yaw rate sensor 23 from a timing before the approach of the pedestrian 80 and identify the position in the transverse direction of the figure of the pedestrian 80 with respect to the advancing direction of the vehicle 20 from the image information acquired by the camera 21, and thus identify the transverse position of the pedestrian 80 from the positional relationship between the position in the transverse direction of the vehicle 20 and the position in the transverse direction of the pedestrian 80 identified from the image information.

The processing is performed to transmit the image information acquired by the camera 21 at the time slots before and after the approach of the pedestrian 80. For example, the communication control unit 270 acquires, from the storage unit 290, the image information captured during a period from a predetermined timing before the approach of the pedestrian 80 to the present and stored in the storage unit 290, and causes the image information acquired from the storage unit 290 to be transmitted to the call center 70. Moreover, the communication control unit 270 may repeat the processing to transmit the image information which is acquired sequentially by the camera 21 to the call center 70.

If it is determined that the occupant 60 has not responded at S512, the process proceeds to S922. At S922, the call center 70 determines whether the vehicle 20 remains in the location where it has approached the pedestrian 80. The processing at S922 may be similar to the processing at S622. If it is determined that the vehicle 20 remains in the location where it has approached the pedestrian 80 at S922, at S924, the call center 70 makes the emergency request for the emergency vehicle 72 and the process is terminated. If it is determined that the vehicle 20 does not remain in the location where it has approached the pedestrian 80 at S922, at S932, the call center 70 determines whether the possibility is low that the pedestrian 80 has walked past the vehicle 20. For example, based on the transverse position information transmitted at S930, the call center 70 may determine that, when a difference between the transverse position of the pedestrian 80 and the transverse position of the vehicle 20 is equal to or higher than a predetermined value, a possibility is low that the pedestrian 80 has walked past the vehicle 20. If it is determined that the possibility is low that the pedestrian 80 has walked past the vehicle 20 at S932, the process proceeds to S924 and the emergency request is made for the emergency vehicle 72. If it is determined that the possibility is not low that the pedestrian 80 has walked past the vehicle 20, at S936, the call connection with the communication unit 34 is maintained and the responder of the call center 70 continues calling to the occupant 60. Even when the transverse position information suggests that possibility is not low that the pedestrian 80 has walked past, a possibility still remains that it may not determine definitely whether the pedestrian 80 has walked past, so that it is preferred to continue calling to the occupant 60.

In this manner, according to the fifth processing procedure, the control device 40 transmits the position information of the vehicle 20 after the approach of the pedestrian 80 to the call center 70, so that the call center 70 can determine whether the vehicle 20 remains at the scene. Also, even if it is determined that the vehicle 20 does not remain at the scene, it can be appropriately determined whether the possibility is low that the pedestrian 80 has walked past the vehicle 20. As such, the dispatch of the emergency vehicle 72 can be requested promptly even when the occupant 60 cannot speak with the responder of the call center 70. Moreover, unnecessary dispatching of the emergency vehicle 72 can be reduced.

Hereinabove, the first processing procedure through the fifth processing procedure have been described in connection with FIG. 4 to FIG. 8. The first processing procedure through the fifth processing procedure can be combined in any combination. As an example, the emergency request may be made when the first processing procedure through the fifth processing procedure are performed respectively, and it is determined in all the processing procedures to make the emergency request. Moreover, the emergency request may be made if it is determined to make the emergency request in at least one processing procedure. The emergency request may be made if a predetermined number or more of the processing procedures provide the determination result to make the emergency request. The emergency request may be made if the number of the processing procedures that have provided the determination result to make the emergency request is greater than the number of the processing procedures that have provided the determination result not to make the emergency request.

As described above, along with transmitting the call information to the call center 70, the control device 40 can transmit the information detected at the vehicle 20 after determination that the vehicle 20 has approached the pedestrian 80 to the call center 70, as the information for the call center 70 to determine whether it is required to dispatch the emergency vehicle 72. As such, the dispatch of the emergency vehicle 72 can be requested promptly even when the responder of the call center 70 cannot speak over the phone with the occupant 60. Moreover, the possibility can be reduced to cause the situation where the emergency vehicle 72 is unnecessarily dispatched and there is not the pedestrian 80 nor the vehicle 20 at the scene when the emergency vehicle 72 arrives at the scene.

Note that the vehicle 20 is a vehicle as an example of transportation equipment. The vehicle may be an automobile such as an automobile comprising an internal combustion engine, an electric vehicle, and a fuel cell vehicle (FCV). The automobile includes, e.g., a bus, a truck, and a two-wheeled vehicle. The vehicle may be a saddle type vehicle or the like, and may be a motorcycle. The transportation equipment includes, aside from the vehicle, equipment such as an aircraft including an unmanned aircraft, and a ship. The transportation equipment may be any equipment for transporting people or items. The transportation equipment is an example of the mobile object. The mobile object is not limited to the transportation equipment but may be any movable equipment.

Figure 9:
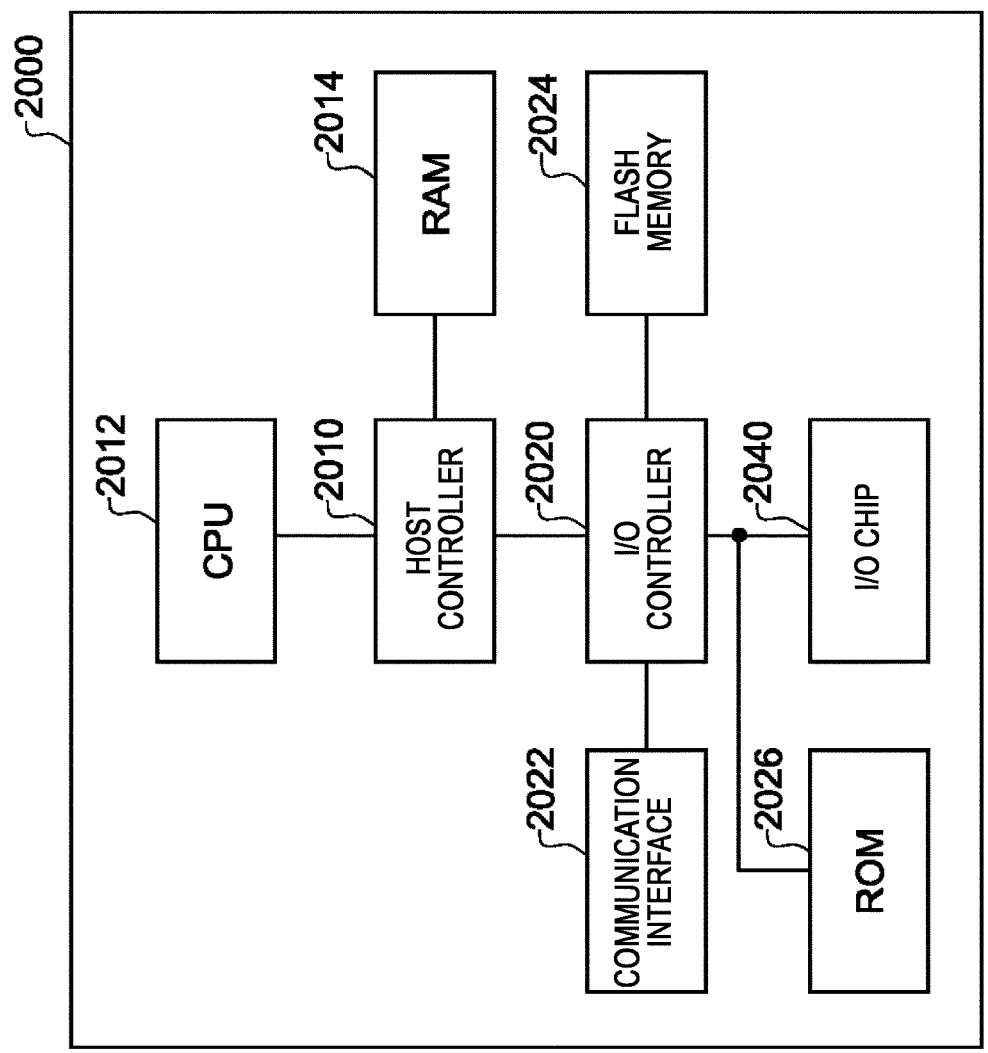
FIG. 9 illustrates an exemplary computer 2000 in which some embodiments of the present invention may be wholly or partially embodied.

FIG. 9 illustrates an exemplary computer 2000 in which some embodiments of the present invention may be wholly or partially embodied. A program installed in the computer 2000 can cause the computer 2000 to function as an apparatus such as the control device 40 or each part the apparatus according to the embodiments, perform operations associated with the apparatus or each part of the apparatus, and/or perform a process or steps of the process according to the embodiments. Such a program may be executed by a CPU 2012 to cause the computer 2000 to perform specific operations associated with some or all of blocks in the processing procedures and block diagrams described herein.

The computer 2000 according to the present embodiment includes the CPU 2012 and a RAM 2014, which are connected to each other by a host controller 2010. The computer 2000 also includes a ROM 2026, a flash memory 2024, a communication interface 2022, and an I/O chip 2040. The ROM 2026, the flash memory 2024, the communication interface 2022, and the I/O chip 2040 are connected to the host controller 2010 via an I/O controller 2020.

The CPU 2012 operates in accordance with a program stored in the ROM 2026 and the RAM 2014, thereby controlling each unit.

The communication interface 2022 communicates with other electronic devices via a network. The flash memory 2024 stores a program and data used by the CPU 2012 in the computer 2000. The ROM 2026 stores a boot program or the like executed by the computer 2000 upon activation, and/or a program dependent on hardware of the computer 2000. The I/O chip 2040 may also connect various I/O units, such as a keyboard, a mouse, and a monitor, to the I/O controller 2020 via I/O ports, such as a serial port, a parallel port, a keyboard port, a mouse port, a monitor port, an USB port, and an HDMI (registered trademark) port.

The program is provided via a computer-readable storage medium, such as a CD-ROM, a DVD-ROM, or a memory card, or via a network. The RAM 2014, the ROM 2026, or the flash memory 2024 are examples of the computer-readable storage medium. The program is installed in the flash memory 2024, the RAM 2014, or the ROM 2026, and executed by the CPU 2012. Information processing described in such a program is read by the computer 2000 to link the program with the various types of hardware resources as mentioned above. The apparatus or method may be configured by implementing the information operation or processing according to the use of the computer 2000.

For example, when performing the communication between the computer 2000 and an external device, the CPU 2012 may execute a communication program loaded in the RAM 2014 and, based on the processing described in the communication program, instruct the communication interface 2022 to perform communication processing. The communication interface 2022, under control of the CPU 2012, reads transmission data stored in a transmission buffer processing area provided in a recording medium such as the RAM 2014 and the flash memory 2024, transmits the read transmission data to the network, and writes the received data received from the network in a reception buffer processing area or the like provided on a recording medium.

Moreover, the CPU 2012 may allow the RAM 2014 to read all or necessary parts of a file or database stored in the recording medium such as the flash memory 2024, and perform various types of processing for the data stored on the RAM 2014. The CPU 2012 then writes back the processed data in the recording medium.

Various types of information such as various types of programs, data, tables, and databases may be stored in the recording medium for information processing. On the data read from the RAM 2014, the CPU 2012 may perform various types of processing including various types of operations, information processing, condition determination, conditional branching, unconditional branching, information retrieval/conversion, and the like, which are described in the specification and specified by an instruction sequence of the program, and writes back the results in the RAM 2014. The CPU 2012 may also retrieve information in a file, database, or the like in the recording medium. For example, when the recording medium stores a plurality of entries each having an attribute value of a first attribute associated with an attribute value of a second attribute, the CPU 2012 may retrieve an entry from the plurality of entries that matches a condition in which the attribute value of the first attribute is specified, and read the attribute value of the second attribute stored in the entry, thereby acquiring the attribute value of the second attribute associated with the first attribute that satisfies a predetermined condition.

The programs or software modules described above may be stored in the computer-readable storage medium on the computer 2000 or in the vicinity of the computer 2000. A recording medium such as a hard disk or a RAM provided in a server system connected to a dedicated communication network or the Internet is usable as the computer-readable storage medium. The program stored in the computer-readable storage medium may be provided to the computer 2000 via the network.

The program installed in the computer 2000 and causes the computer 2000 to function as the control device 40 may operate on the CPU 2012 or the like to cause the computer 2000 to function respectively as each part of the control device 40. The information processing described in these programs are read in the computer 2000, thereby functioning as each part of the control device 40 which serves as specific means under cooperation of the software and the various types of hardware resources as described above. Thus, these specific means implement arithmetic operation or processing of information depending on a purpose of use of the computer 2000 in the present embodiment, thereby establishing the control device 40 specific to the purpose of use.

Various embodiments have been described with reference to the block diagrams or the like. In the block diagrams, each block may represent: (1) a step of a process for performing an operation; or (2) each part of an apparatus having a function to perform an operation. A specific step or each part may be implemented by a dedicated circuit, a programmable circuit provided along with computer-readable instructions stored on a computer-readable storage medium, and/or a processor provided along with computer-readable instructions stored on a computer-readable storage medium. The dedicated circuit may include a digital and/or analog hardware circuit, and may include an integrated circuit (IC) and/or a discrete circuit. The programmable circuit may include a reconfigurable hardware circuit, including, e.g., logic operations such as logic AND, logic OR, logic XOR, logic NAND, logic NOR, and the like, as well as memory elements such as a flip-flop, a register, a field programmable gate array (FPGA), a programmable logic array (PLA), and the like.

The computer-readable storage medium may include any tangible device that can store instructions to be performed by a suitable device, so that the computer-readable storage medium having the instructions stored therein constitutes at least a part of a product containing the instructions that can be executed to provide means for performing the operations specified in the processing procedures or block diagrams. Examples of the computer-readable storage medium may include an electronic storage medium, a magnetic storage medium, an optical storage medium, a magneto-electric storage medium, a semiconductor storage medium, and the like. More specific examples of the computer-readable storage medium may include a floppy (registered trademark) disk, a diskette, a hard disk, a random access memory (RAM), a read-only memory (ROM), an erasable programmable read-only memory (EPROM or flash memory), an electrically-erasable programmable read-only memory (EEPROM), a static random access memory (SRAM), a compact disc read-only memory (CD-ROM), a digital versatile disk (DVD), a Blu-ray (registered trademark) disk, a memory stick, an integrated circuit card, and the like.

The computer-readable instructions may include assembler instructions, instruction set architecture (ISA) instructions, machine instructions, machine-dependent instructions, microcodes, firmware instructions, state setting data, or any of source codes or object codes described in any combination of one or more programming languages, including object-oriented programming languages, such as Smalltalk (registered trademark), JAVA (registered trademark), or C++, and conventional procedural programming languages, such as "C" programming languages or similar programming languages.

The computer-readable instructions are provided to processors or programmable circuits of general-purpose computers, special-purpose computers, or other programmable data processing apparatuses, locally or via a local area network (LAN) or a wide area network (WAN) such as the Internet, wherein the computer-readable instructions may be executed to provide means for performing the operations specified in the described processing procedures or block diagrams. Examples of the processors include a computer processor, a processing unit, a microprocessor, a digital signal processor, a controller, a microcontroller, and the like.

While the present invention has been described using the embodiments, the technical scope of the present invention is not limited to the scope described in the above embodiments. It is apparent to persons skilled in the art that various alterations or improvements can be added to the above-described embodiments. It is also apparent from the description of the claims that the embodiments added with such alterations or improvements can be included in the technical scope of the present invention.

Each processing of the operations, procedures, steps, stages, and the like performed by the apparatus, system, program, and method illustrated in the claims, specification, and diagrams can be embodied in any order unless the execution order is explicitly specified by terms "prior to," "before," or the like and unless the output from a previous process is used in a later process. Even if the operational flow is described using terms "first," "next," or the like in the claims, specification, and diagrams, it does not necessarily mean that the flow must be performed in this order.

EXPLANATION OF REFERENCES

10: report system
20: vehicle
21: camera
22: vehicle speed sensor
23: yaw rate sensor
24: GNSS receiver
25: operated equipment sensor
29: sensor
30: AEB
34: communication unit
38: door
40: control device
60: occupant
70: call center
72: emergency vehicle
80: pedestrian
90: network
200: processing unit
210: vehicle position identification unit
220: target position identification unit
230: operation information acquisition unit
240: determination unit
260: call control unit
270: communication control unit
290: storage unit
2000: computer
2010: host controller
2012: CPU
2014: RAM
2020: I/O controller
2022: communication interface
2024: flash memory
2026: ROM
2040: I/O chip

What is claimed is:

1. A communication control device comprising:
   a determination unit configured to determine whether a target has approached a mobile object based on information detected by a sensor mounted on the mobile object; and
   a communication control unit configured to control a communication unit that makes a call to a call center based on a determination result by the determination unit,
   wherein
   the communication control unit causes first information to be transmitted to the call center, the first information relating to information detected at the mobile object during a call connection with the call center, the call connection being started in response to the call.

2. The communication control device according to claim 1, wherein:

the communication control unit, at a time of the call, causes transmission of second information including information different from the first information to the call center.

3. The communication control device according to claim 2, wherein:
the second information is at least either of identification information of the mobile object and a moving speed of the mobile object when the determination unit determines that the target has approached the mobile object.

4. The communication control device according to claim 1, wherein:
the communication control unit is configured to:
cause a call to the call center when the determination unit determines that the target has approached the mobile object; and
after the determination unit determines that the target has approached the mobile object, transmit the first information when a speech by an occupant of the mobile object is not detected, or not transmit the first information when a speech by an occupant of the mobile object is detected.

5. The communication control device according to claim 1, wherein:
the first information includes information indicating whether an occupant in the mobile object is present, which is detected at the mobile object after the determination unit determines that the target has approached the mobile object.

6. The communication control device according to claim 1, wherein:
the first information includes operation information of the mobile object by an occupant of the mobile object, which is detected at the mobile object after the determination unit determines that the target has approached the mobile object.

7. The communication control device according to claim 1, wherein:
the first information includes information indicating a moving speed of the mobile object, which is detected at the mobile object after the determination unit determines that the target has approached the mobile object.

8. The communication control device according to claim 1, wherein:
the first information includes position information of the mobile object, which is detected at the mobile object after the determination unit determines that the target has approached the mobile object.

9. The communication control device according to claim 1, wherein:
the first information includes image information acquired by an image capturing unit mounted on the mobile object after the determination unit determines that the target has approached the mobile object.

10. The communication control device according to claim 1, wherein:
the first information includes position information of the target in a direction intersecting a moving direction of the mobile object, which is detected at the mobile object when the determination unit determines that the target has approached the mobile object, and position information of the mobile object after the determination unit determines that the target has approached the mobile object.

11. The communication control device according to claim 1, wherein:
the first information includes information detected at the mobile object before and after the determination unit determines that the target has approached the mobile object.

12. The communication control device according to claim 1, wherein:
the mobile object is a vehicle.

13. The communication control device according to claim 2, wherein:
the communication control unit is configured to:
cause a call to the call center when the determination unit determines that the target has approached the mobile object; and
after the determination unit determines that the target has approached the mobile object, transmit the first information when a speech by an occupant of the mobile object is not detected, or does not transmit the first information when a speech by an occupant of the mobile object is detected.

14. The communication control device according to claim 2, wherein:
the first information includes information indicating whether an occupant in the mobile object is present, which is detected at the mobile object after the determination unit determines that the target has approached the mobile object.

15. The communication control device according to claim 2, wherein:
the first information includes operation information of the mobile object by an occupant of the mobile object, which is detected at the mobile object after the determination unit determines that the target has approached the mobile object.

16. The communication control device according to claim 2, wherein:
the first information includes information indicating a moving speed of the mobile object, which is detected at the mobile object after the determination unit determines that the target has approached the mobile object.

17. The communication control device according to claim 2, wherein:
the first information includes position information of the mobile object, which is detected at the mobile object after the determination unit determines that the target has approached the mobile object.

18. A mobile object comprising the communication control device according to claim 1.

19. A communication control method comprising:
determining whether a target has approached a mobile object based on information detected by a sensor mounted on the mobile object;
controlling a communication unit configured to make a call to a call center based on a determination result about whether the target has approached the mobile object; and
causing first information to be transmitted to the call center, the first information relating to information detected at the mobile object during a call connection with the call center, the call connection being started in response to the call.

20. A non-transitory computer-readable storage medium having stored thereon a program that causes a computer to function as:
a determination unit configured to determine whether a target has approached a mobile object based on information detected by a sensor mounted on the mobile object; and a communication control unit configured to control a communication unit that makes a call to a call center based on a determination result by the determination unit, wherein by the program, the communication control unit causes first information to be transmitted to the call center, the first information relating to information detected at the mobile object during a call connection with the call center, the call connection being started in response to the call.

\* \* \* \* \*